(12) United States Patent
Chen et al.

(10) Patent No.: US 12,535,741 B1
(45) Date of Patent: Jan. 27, 2026

(54) REPRESENTING LITHOGRAPHIC LAYOUTS USING PARAMETRIC CURVES

(71) Applicant: Synopsys, Inc., Mountain View, CA (US)

(72) Inventors: Yung-Yu Chen, Hsinchu (TW); Wen-Li Cheng, Hsinchu (TW)

(73) Assignee: Synopsys, Inc., Sunnyvale, CA (US)

( * ) Notice: Subject to any disclaimer, the term of this patent is extended or adjusted under 35 U.S.C. 154(b) by 806 days.

(21) Appl. No.: 17/831,235

(22) Filed: Jun. 2, 2022

Related U.S. Application Data

(60) Provisional application No. 63/196,015, filed on Jun. 2, 2021.

(51) Int. Cl.
*G03F 7/00* (2006.01)
*G06F 30/30* (2020.01)
*G06F 30/392* (2020.01)

(52) U.S. Cl.
CPC ............ *G03F 7/705* (2013.01); *G06F 30/392* (2020.01)

(58) Field of Classification Search
None
See application file for complete search history.

(56) References Cited

U.S. PATENT DOCUMENTS

| | | | | |
|---|---|---|---|---|
| 5,717,847 A * | 2/1998 | Schulmeiss | ............ | G06T 11/203 345/442 |
| 7,600,212 B2 * | 10/2009 | Zach | .......................... | G03F 1/36 716/54 |
| 7,849,423 B1 * | 12/2010 | Yenikaya | ................... | G03F 1/36 716/55 |
| 8,910,092 B1 * | 12/2014 | Shih | .......................... | G03F 1/36 716/54 |
| 10,444,734 B2 * | 10/2019 | Koranne | ............ | G05B 19/4099 |
| 10,620,531 B1 * | 4/2020 | Jaklic | ..................... | G06T 7/0006 |
| 10,635,776 B1 * | 4/2020 | Yan | ......................... | G06F 30/39 |
| 10,853,551 B1 * | 12/2020 | Jaklic | ...................... | G06F 30/39 |
| 10,860,531 B2 * | 12/2020 | Whitmer | ............. | G06F 11/1458 |
| 11,768,442 B2 * | 9/2023 | Tel | .......................... | G06F 30/20 438/8 |
| 2020/0278612 A1 * | 9/2020 | Yasui | ...................... | G03F 7/705 |

OTHER PUBLICATIONS

J. Choi et al., "Requirements of data technology for EUV photomask," Photomask Technology 2019, Proc. of SPIE vol. 11148, 16 pages. (Year: 2019).*
Choi, J. et al. "Curvilinear Data Format Working Group for MBMW Era." Proceedings of SPIE, vol. 11610, Novel Patterning Technologies 2021, Feb. 22, 2021, pp. 1-14.

\* cited by examiner

*Primary Examiner* — Leigh M Garbowski
(74) *Attorney, Agent, or Firm* — Fenwick & West LLP

(57) ABSTRACT

A layout is used in a computational lithography process. For example, the layout may be the layout of the lithographic mask or the layout of the desired resist shape. The layout is made up of multiple disjoint shapes. At least some of the disjoint shapes are represented by parametric curve representations, rather than polygons or other rectilinear representations. The parametric curve representations of the shapes are then used in the computational lithography process.

12 Claims, 10 Drawing Sheets

REPRESENTING LITHOGRAPHIC LAYOUTS USING PARAMETRIC CURVES

RELATED APPLICATION

This application claims priority under 35 U.S.C. § 119 (e) to U.S. Provisional Patent Application Ser. No. 63/196,015, "Representing Lithographic Layouts using Parametric Curves," filed Jun. 2, 2021. The subject matter of all of the foregoing is incorporated herein by reference in its entirety.

TECHNICAL FIELD

The present disclosure relates to lithography modeling. In particular, the present disclosure relates to lithographic layouts, for example mask layouts or target layouts used in the modeling and/or fabrication of integrated circuits.

BACKGROUND

One step in the manufacture of semiconductor wafers involves lithography. In a typical lithography process, a source produces light that is collected and directed by collection/illumination optics to illuminate a lithographic mask. Projection optics relay the pattern produced by the illuminated mask onto a wafer, exposing resist on the wafer according to the illumination pattern. The patterned resist is then used in a process to fabricate structures on the wafer.

As designs for integrated circuits are becoming larger, denser, and more complex, the demands on computational lithography solutions for developing the masks used in fabrication are increasing. The features on masks are becoming smaller and less rectilinear. For example, advanced mask writing tools can produce curvilinear shapes. However, lithographic shapes traditionally are represented as polygons. Representing curved shapes as polygons makes their simulation more difficult and more computationally intensive.

SUMMARY

In some aspects, a layout is used in a computational lithography process. For example, the layout may be the layout of the lithographic mask or the layout of the desired resist shape. The layout is made up of multiple disjoint shapes. At least some of the disjoint shapes are represented by parametric curve representations, rather than polygons or other rectilinear representations. The parametric curve representations of the shapes are then used in the computational lithography process.

Other aspects include components, devices, systems, improvements, methods, processes, applications, computer readable mediums, and other technologies related to any of the above.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to representing lithographic layouts using parametric curves. Traditionally, mask layouts and other lithographic layouts are represented by polygons and, more specifically, rectilinear polygons. However, as lithography becomes more complex and challenging, mask layouts are also becoming more complex. The use of sub-resolution assist features and non-rectangular and even curved shapes makes the traditional representation based on rectilinear polygons less than ideal. Representing a curved shape by rectilinear polygons requires a large number of vertices and may still represent the curved edge by a staircase approximation. Even if non-rectilinear polygons are allowed, a curved edge will still require a polygon with a large number of sides to approximate the curve.

In the approach described below, layouts are piecewise represented by parametric curves, for example the cubic Bezier curve, rather than by polygons. The layouts could be the layout of the mask itself, the layout of the resulting printed pattern on the wafer (i.e., the resist contour), a two-dimensional representation of the aerial image produced by the mask, or other types of two-dimensional images used for computational lithography. The parametric curves could represent the border of the layout, the centerline of the layout, an isocontour line or other curves used to represent the layout.

This parametric curve representation can be a more compact and more computationally efficient representation of the layout for certain computational lithography processes. For example, if it is desired to locally change a shape, this may be achieved simply by modifying only those curves in the local vicinity of the desired change. In addition, by selecting parametric curves with enough degrees of freedom to adequately represent the layouts but not too many degrees of freedom, overfitting may be avoided and manual changes may be made more intuitively. As a result, the computation speed is increased and the computation resources required (memory and processor utilization) is reduced.

Figure 1A:
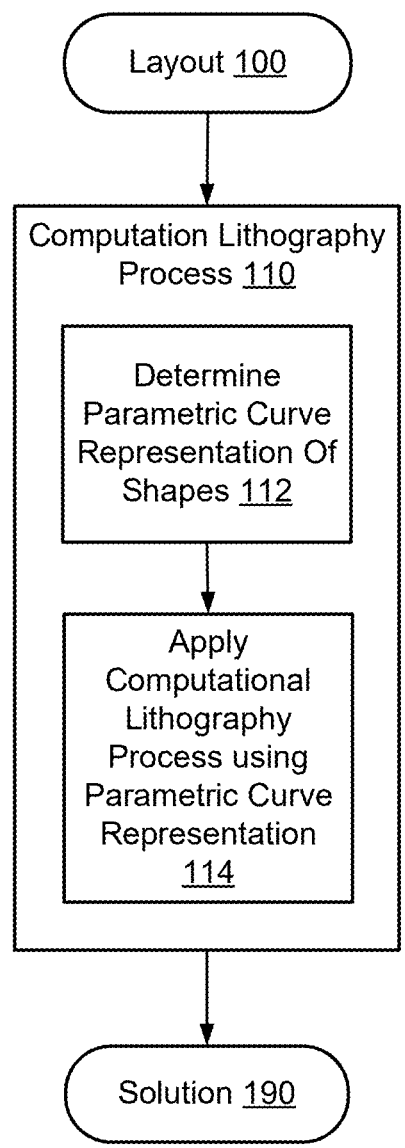
FIG. 1A depicts a flowchart for a computational lithography process in accordance with some embodiments of the present disclosure.

FIG. 1A depicts a flowchart for a computational lithography process in accordance with some embodiments of the present disclosure. The techniques described in this disclosure may be applied to many types of computational lithography processes 110. This may include mask synthesis processes (e.g., design a mask to achieve a desired result), mask verification processes (e.g., confirm whether a mask design produces the result desired) and mask fabrication processes (e.g., fabricate desired mask design). Examples of mask synthesis processes include optical proximity correction, resolution enhancement technology, phase shifting masks, double patterning masks, sub-resolution assist features and inverse lithography. Mask rule checking is an example of mask verification processes. It may also include computational lithography processes relating to optical sources, optical projection, resist development or other aspects other than the mask development process.

The input to the computational lithography process 110 is a layout 100 of various geometrical shapes. For the computational lithography process 110, the layout 100 may be a layout of a mask used to fabricate an integrated circuit, although the parametric curve representation is not limited to this example.

The result of the computational lithography process 110 will generically be referred to as the "solution" 190. The solution includes a representation of the layout using parametric curves. In one approach, the computational lithography process 110 is applied to the shapes in the layout by using a parametric curve representation for at least some of the shapes. The layout 100 includes a large number of disjoint shapes. A parametric curve representation is determined 112 for at least some of the shapes. The computational lithography process is then applied 114 using the parametric curve representation of the shapes.

Figure 1B:
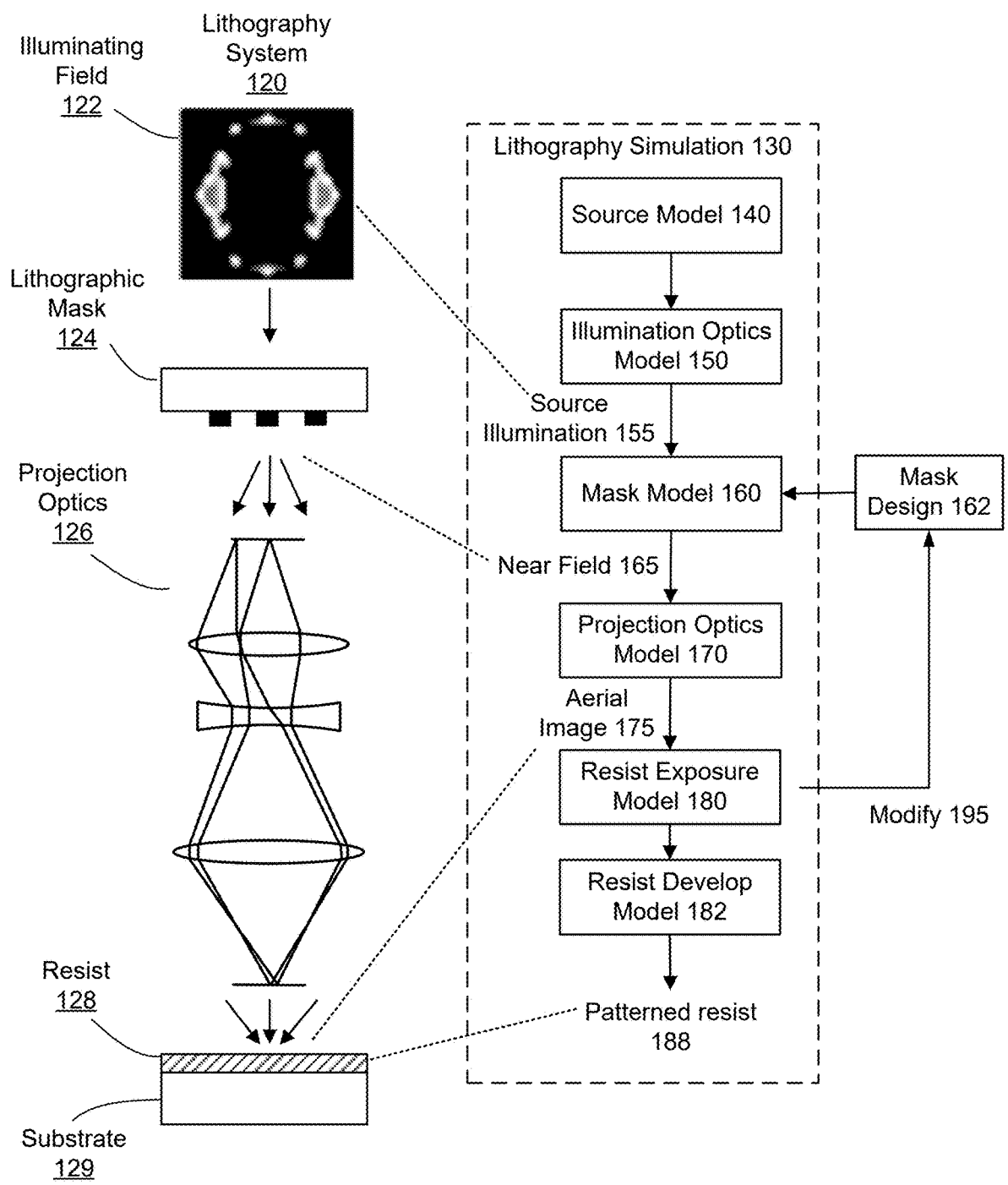
FIG. 1B is a flowchart of a computational lithography process in accordance with some embodiments of the present disclosure.

FIG. 1B is a flowchart of a computational lithography process in accordance with embodiments of the present disclosure. In this example, the computational lithography process is for design of a lithographic mask. The left side of FIG. 1B shows a lithography system 120 and the right side of FIG. 1 shows a computational lithography flow 130 for simulating that system. In a lithography system 120, a light source (not shown) produces a light distribution (the illuminating field 122) that is incident on a lithographic mask 124 that has a certain mask topology. Light from the illuminating field 122 propagates through the lithographic mask 124 or is reflected by the mask, resulting in a light distribution referred to as the near field. The near field is imaged by projection optics 126 onto resist 128 on a substrate 129 (e.g., a semiconductor wafer). The light distribution illuminating the resist 128 is referred to as the aerial image. The aerial image exposes a resist process (e.g., including exposure, post-exposure bake (PEB), and development) that results in a three-dimensional shape (profile) in the resist 128. Terms such as light and optical are meant to include all relevant wavelengths, including ultraviolet, deep ultraviolet and extreme ultraviolet, and are not limited to just visible wavelengths.

The right side of FIG. 1B shows a computational lithography flow 130 that simulates the lithography system 120, including modifying a design of a lithographic mask, according to embodiments of the present disclosure. The dashed box 130 includes simulations or models of the overall lithography configuration. For convenience, separate boxes are shown to correspond to physical components or processes, but the simulations need not be implemented in this way. For example, source model 140 represents a model of the source and illumination optics models 150 models the effect of illumination optics. These generate the source illumination 155, which is an estimate of the source illumination 122 incident on the mask. However, actual simulation may or may not use separate models 140, 150 for the source and optics. In some cases, the two may be combined into a single model or simulation that predicts the source illumination 155.

Mask model 160 models the effect of the lithographic mask 124 on the incident illumination 122. Here, the mask 124 is represented by mask design 162. Projection optics model 170 represents the effect of optics 126. The source illumination 155 is filtered by mask model 160. The resulting field is referred to as the near field 165. This is applied to a model 170 of the projection optics to estimate the aerial image 175 that exposes the resist 128 on the wafer 129. The resist is modeled by a resist exposure model 180 and a resist development model 182, resulting in an estimate of the patterned resist 188. Additional modeling may be used to predict etching, doping, deposition or other semiconductor fabrication processes.

Various results of the lithography simulation 130 may be used to modify 195 the mask design 162. For example, the predicted near field 165 may be analyzed and then used to modify 195 the mask design 162. The aerial image 175 and patterned resist 188 may also be used for this purpose.

Metrics derived from these quantities may also be used. One example is the difference between the predicted aerial image 175 and a desired aerial image. Differences between other predicted signals (e.g., the near field 165) and the desired signal may also be used. Differences between the predicted locations of the edges of the patterned resist 188 (resist contours) and the desired locations of those edges is another example. This may be referred to as edge placement error.

As another example, one measure of the quality of patterned resist 188 is the critical dimension (CD). CD is the dimension of certain features in the patterned resist. Typically, the CD is the smallest line width or space width printed in the resist. As such, it is a measure of the resolution of the resist and lithography process. The models in simulation 130 may be used to predict the CDs for a given lithography configuration. The predicted CD may be used to modify 195 the mask design 162.

Another measure of the quality of patterned resist 188 is defects. Examples of defects include when two printed lines that are supposed to be separate are merged, when a printed line that is supposed to be continuous has a break, and when a printed feature that is supposed to have a hole in the center is actually filled in. Predicted defects and defect rate may also be used to modify 195 the mask design 162. Other metrics may be based on the differences between a desired and a predicted result.

In the computational lithography process 130, various layouts may be represented by parametric curves, rather than rectilinear polygons. For example, the mask design 162 itself includes many shapes, some or many of which may be represented by parametric curves. The source illumination 155, near field 165 and aerial image 175 may also be represented by parametric curves. These quantities are two-dimensional intensity profiles. Parametric curves may be used to represent contours of constant intensity. The patterned resist 188 may also be represented by parametric curves. The resist itself is a three-dimensional shape. It may be represented by contours at different heights of the resist. Both the simulated quantities shown in computational lithography process 130 and the desired target outcomes may be represented by parametric curves.

Figure 2:
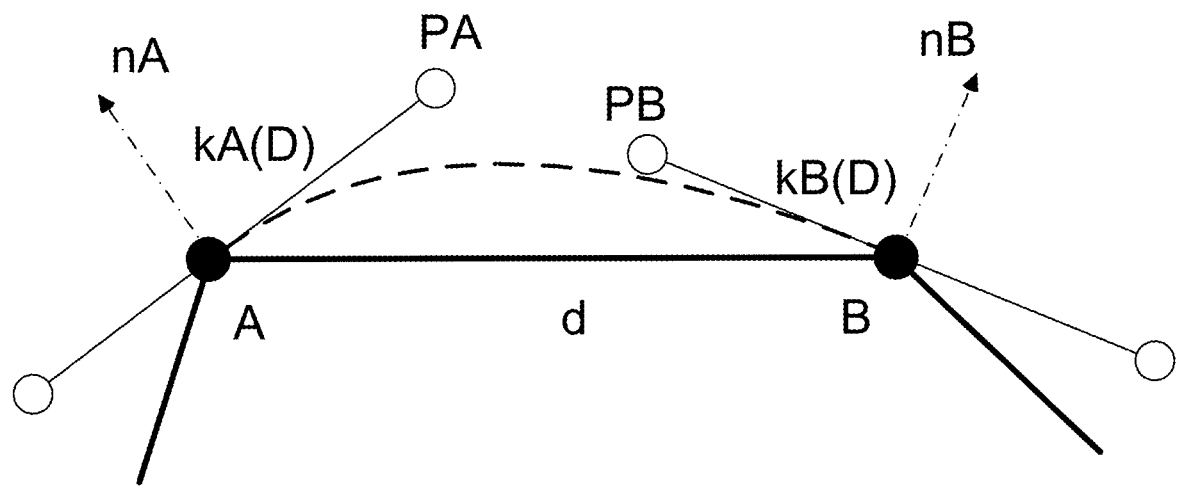
FIG. 2 shows parameterization of a cubic Bezier curve.

The following examples use cubic Bezier curves as the parametric curve, but other parametric curves may also be used. FIG. 2 shows parameterization of a cubic Bezier curve. The Bezier curve is the dashed line connecting vertices A and B. The parameters for the cubic Bezier curve are the endpoints A, B and the handles PA, PB. Both the dashed Bezier curve and the corresponding black line segment A-B may be tangible entities for manipulation and may interact in a coupled way. The Bezier curve is controlled by using the vertices A, B and the handles PA, PB. These define the distance d, the coefficients kA, kB and the tangential directions nA and nB at the vertices A, B. The choice of curve formula may be the cubic Bezier curve or other forms that accept the control points. The explicit equation of the cubic Bezier curve (dashed line) is:

$$\text{Bezier}(t)=(1-t)^3 A+3(1-t)^2 t P^A+3(1-t)t^2 P_B+t^3 B, 0\le t\le 1 \qquad (1)$$

Automated software may change the curve by changing location of the control points A, B, PA and PB. For example, these parameters may be modified as part of the mask development process shown in FIG. 1B. In some cases, layouts may be defined by a fixed grid. The endpoints A, B may be on grid. The handles PA, PB may be off-grid.

Figure 3A:
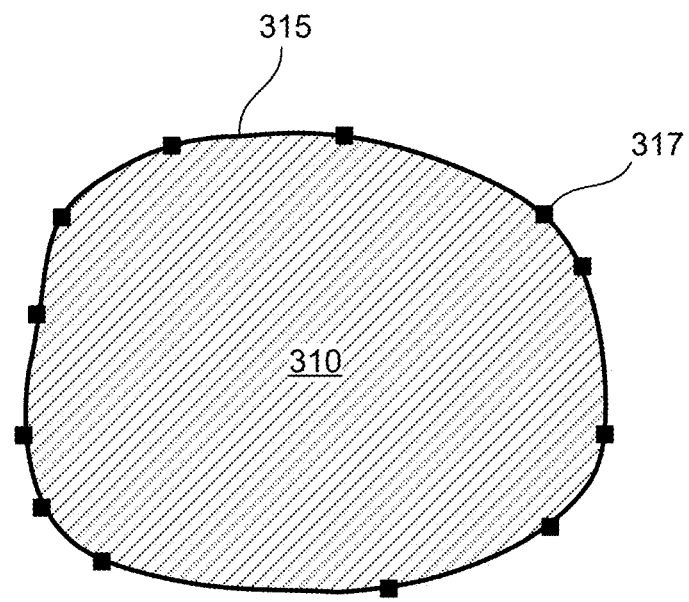
FIGS. 3A and 3B show an example of a parametric curve representation of the edge of a layout and of the centerline of a layout, respectively.

FIG. 3A shows an example of a parametric curve representation of the edge of a layout 310. The edge 315 is represented by a set of cubic Bezier curves. The black squares 317 are the endpoints of each Bezier curve, and the curve connecting adjacent squares 317 is the Bezier curve between endpoints. The handles are not shown.

Figure 3B:
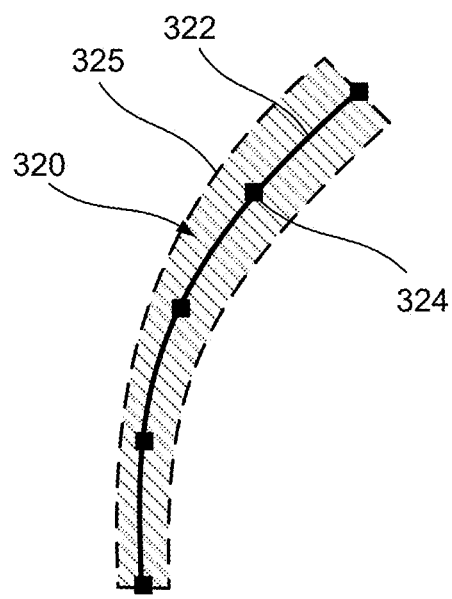

FIG. 3B shows an example of a parametric curve representation of the centerline of a layout 320. The centerline 322 is represented by a set of cubic Bezier curves. The black squares 324 are the endpoints of each Bezier curve, and the curve connecting adjacent squares 324 is the Bezier curve between endpoints. The handles are not shown. The edge 325 of the layout 320 is shown as dashed in FIG. 3B.

Figure 4A:
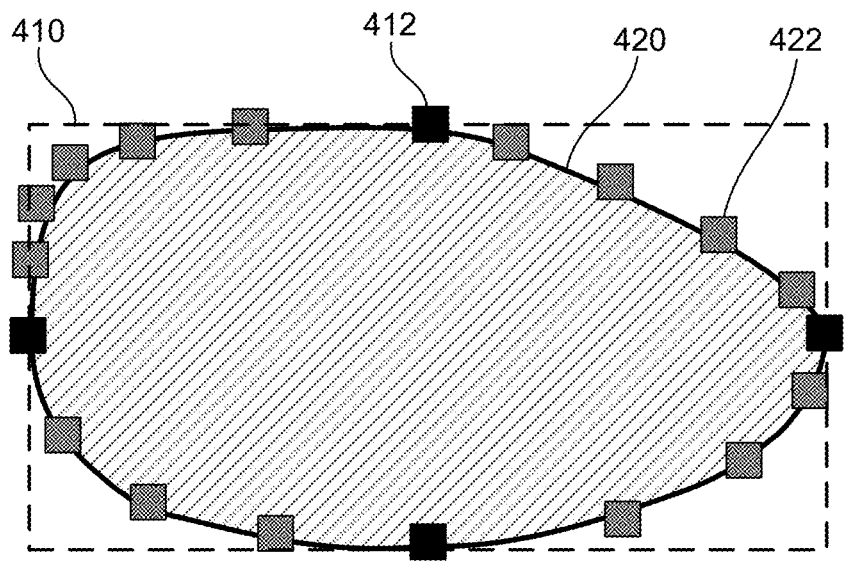
FIGS. 4A-4C, 5A-5B and 6A-6B show some example uses of the parametric curve representation in accordance with some embodiments of the present disclosure.
Figure 4B:
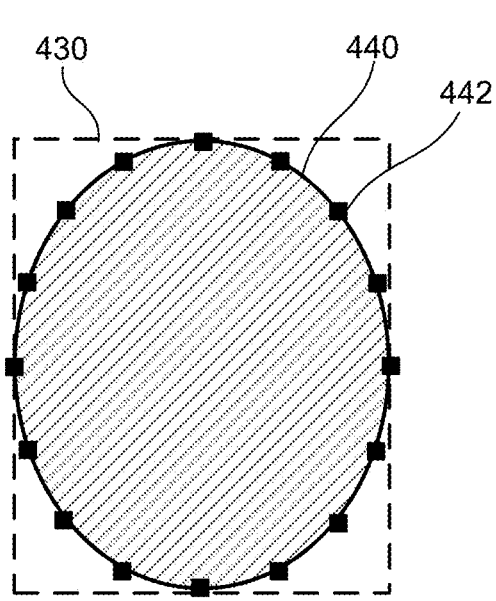
Figure 4C:
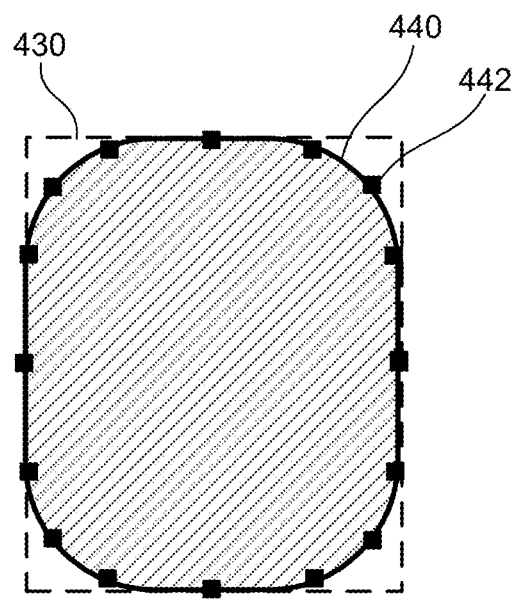
Figure 5A:
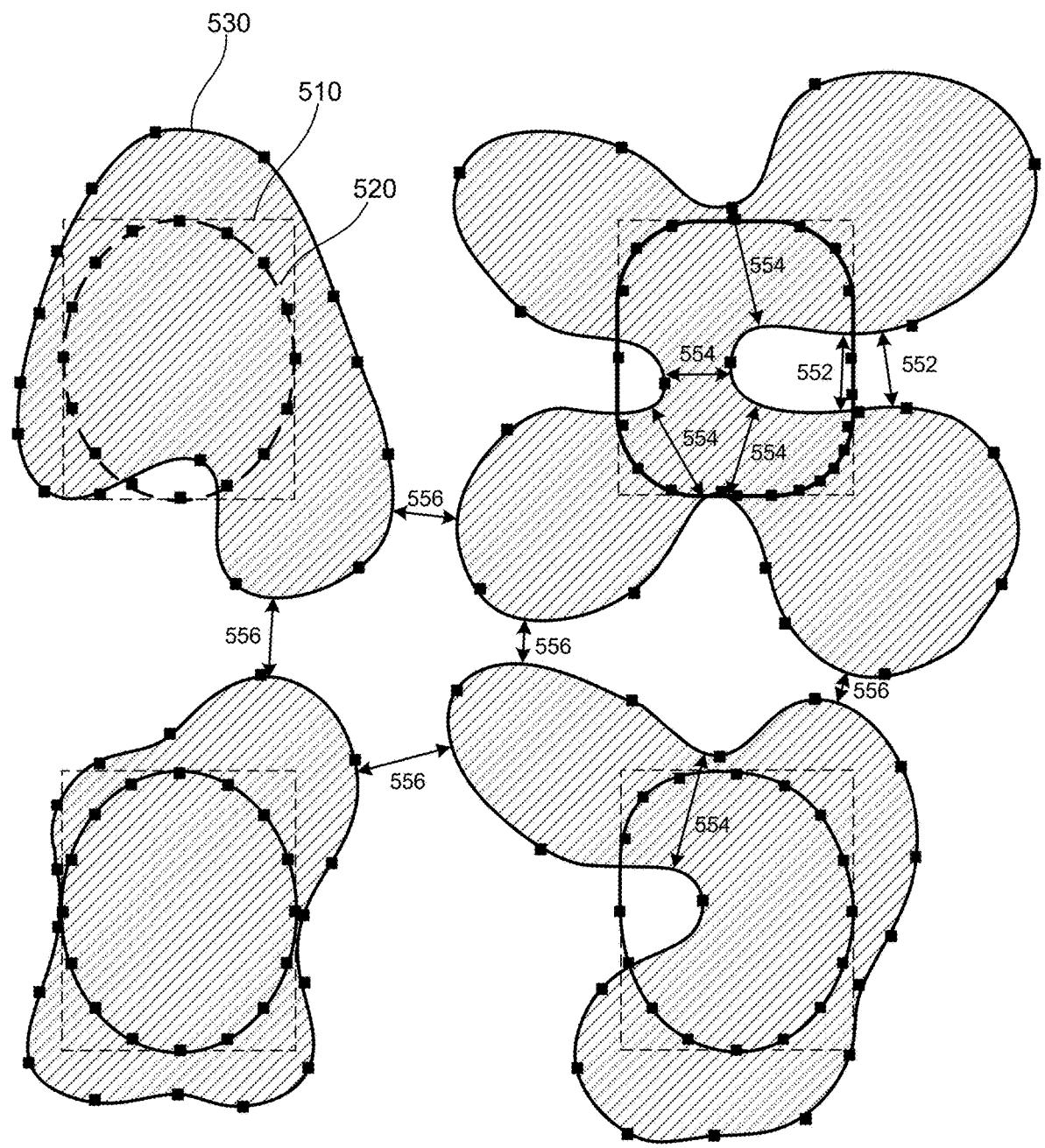

FIGS. 4-6 show some example uses of the parametric curve representation. FIGS. 4A-4C show examples of curve-based target rounding. FIG. 5A shows curvilinear MRC (mask rule checking). FIG. 6 shows curve-and-curvilinear-based feature tracking from a field signal.

FIG. 4A shows an example of curve-based target rounding. The "target" in this example is the desired printed pattern on the wafer, rather than the mask layout. In FIG. 4A, the dashed rectangle 410 is the original or ideal target in the design flow, and the squares 412 in the center of each edge of the rectangle are the original target points that define the rectangle 410. The curve 420 is the rounded target, since rectangles with sharp corners typically end up as rounded shapes. Additional vertices (squares 422) are added on the rounded target and these set of squares 412 and 422 are the endpoints for the cubic Bezier curves.

In FIGS. 4B and 4C, the original rectilinear shape is shown as dashed rectangle 430. The rounded layout is represented by parametric curves 440 defined by the endpoints 442. These two examples use the same number of endpoints, but with different values of the kA, kB coefficients to achieve different amounts of rounding. Here, kA=kB=0.4 in FIG. 4B and kA=kB=0.6 in FIG. 4C.

FIG. 5A shows an example of curvilinear MRC (mask rule checking). Here, the parametric curves are used to determine distances among the mask shapes for rule violation checks. The four dashed rectangles 510 are the ideal rectangular target shapes. The dashed rounded shapes 520 within each rectangle are the rounded target shapes, where the squares represent the endpoints of Bezier curves. The solid edges 530 are the corresponding rounded mask shapes after correction. The edges 530 of the mask layouts are represented by cubic Bezier curves where the squares are the endpoints of the Bezier curves. The layouts 530 are developed by starting with the ideal rounded shapes 520 and allowing the endpoints to move during the computational lithography process. In FIG. 5A, for clarity, only one of the four sets of layouts is labeled with reference numbers 510, 520, 530.

In FIG. 5A, the lines with arrows at both ends are mask rule violations. Lines 552 show where the spacing between edges of a shape is too narrow. Lines 554 show where the mask shape is too thin. Lines 556 show where two mask shapes are too close together.

Figure 5B:
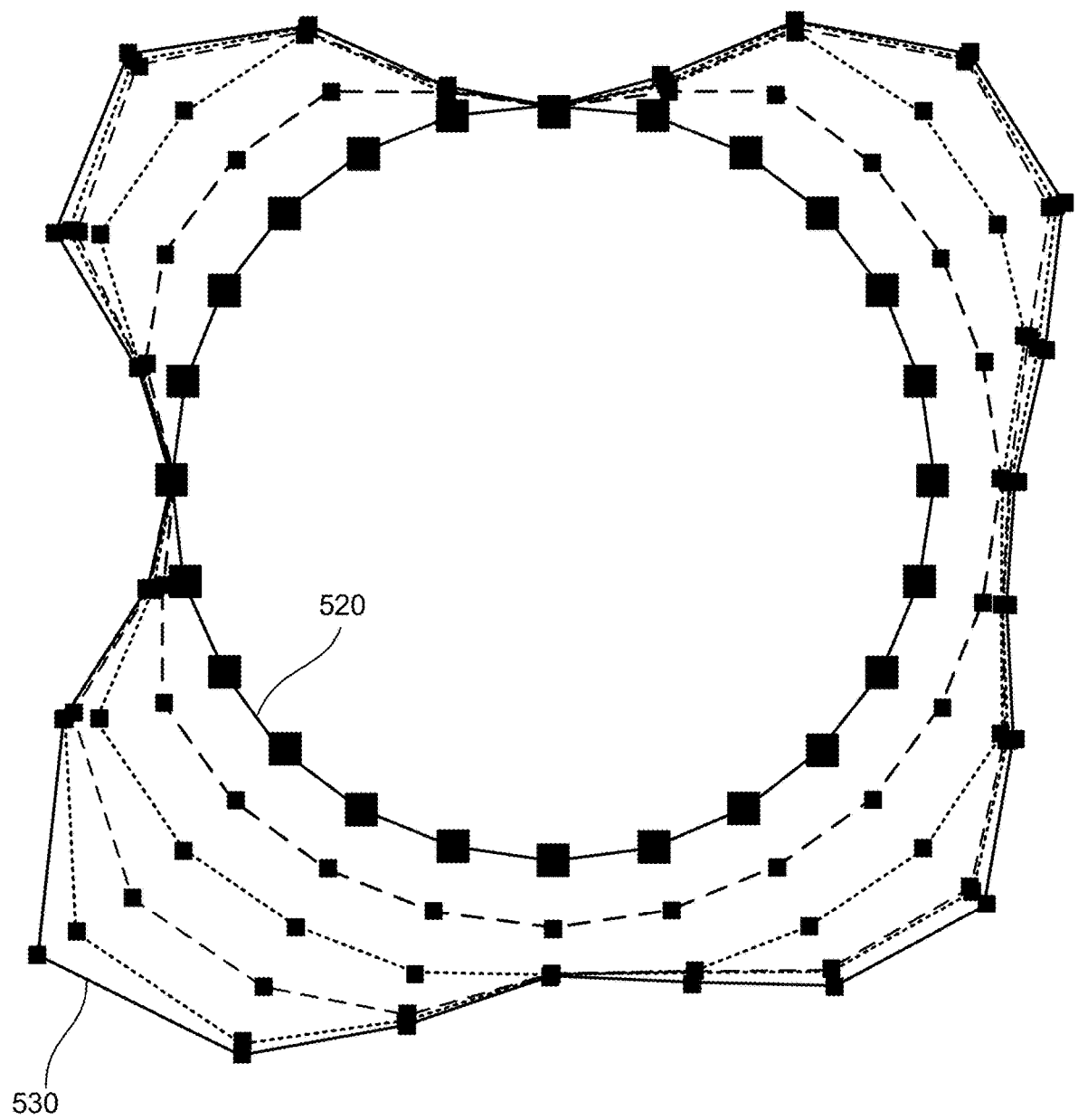

The corrected layouts 530 may be developed from the rounded target shapes 520. As shown in FIG. 5B, an initial shape 520 (the rounded target shape in this example) is seeded with the endpoints marked by the large squares. In this example, there are 24 endpoints to represent a circle. This may be more endpoints than required to represent the target shape, but more endpoints allow more flexibility in the final mask shape. If there are too many endpoints, the contour may be overfitted. In that case, the number of endpoints may be reduced, for example by up-sampling to produce a better fit. The final mask shape 530 is shown by the outer solid contour and the endpoints.

For convenience, FIG. 5B shows the endpoints connected by line segments rather than the Bezier curves. The actual shape of the layout is curved, not the polygon shown in FIG. 5B. The different curves may be matched at their endpoints, for example by matching slope, curvature, etc. The other curves shown in FIG. 5B between the starting point 520 and the final curve 530 are intermediate curves that show development of the mask shape as the endpoints are migrated from their initial positions 520 to the final positions 530. For clarity, the intermediate curves alternate between dashed and dotted line types. Different approaches may be used to develop the final shape of piecewise curves, for example based on reducing the area between actual shape and the shape represented by the piecewise curves. Note that the use of piecewise curves allows local changes to be made more easily, since only the curves in the vicinity of the change are affected.

Figure 6A:
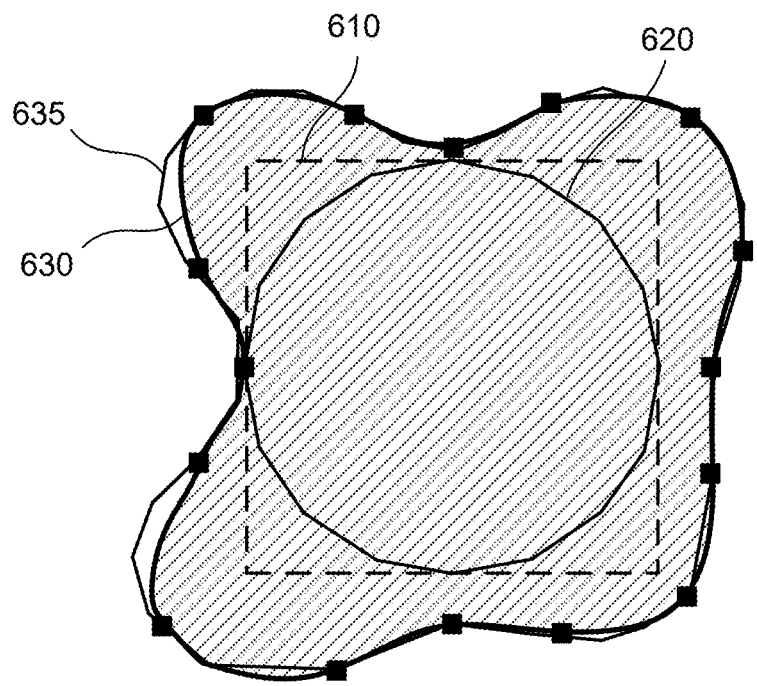
Figure 6B:
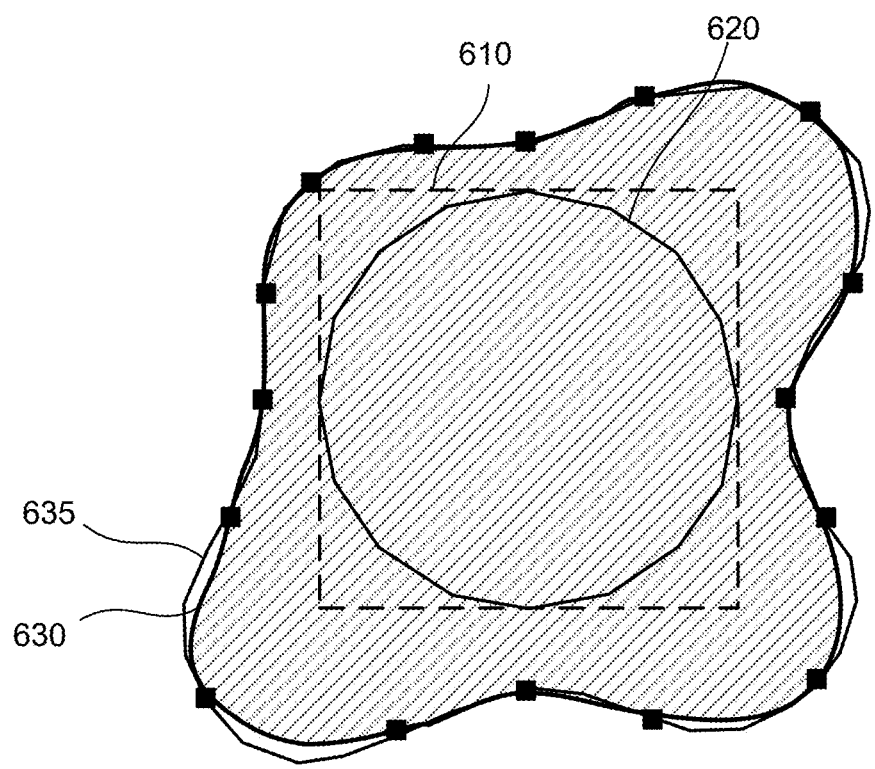

FIGS. 6A and 6B show curve-and-curvilinear-based feature tracking based on field values. In this example, the dashed rectangle 610 is the ideal target and the circle 620 is the rounded target. From this, a signal field is calculated. The signal field is an array of values, such as the near field, aerial image or resist shape. The shape of interest is an isocontour within the signal field. In FIG. 6, the real mask shape 635 is generated by an alternate approach and then fit to Bezier curves. The solid lines 630 are the line segments between the endpoints of the cubic Bezier curves.

Figure 7:
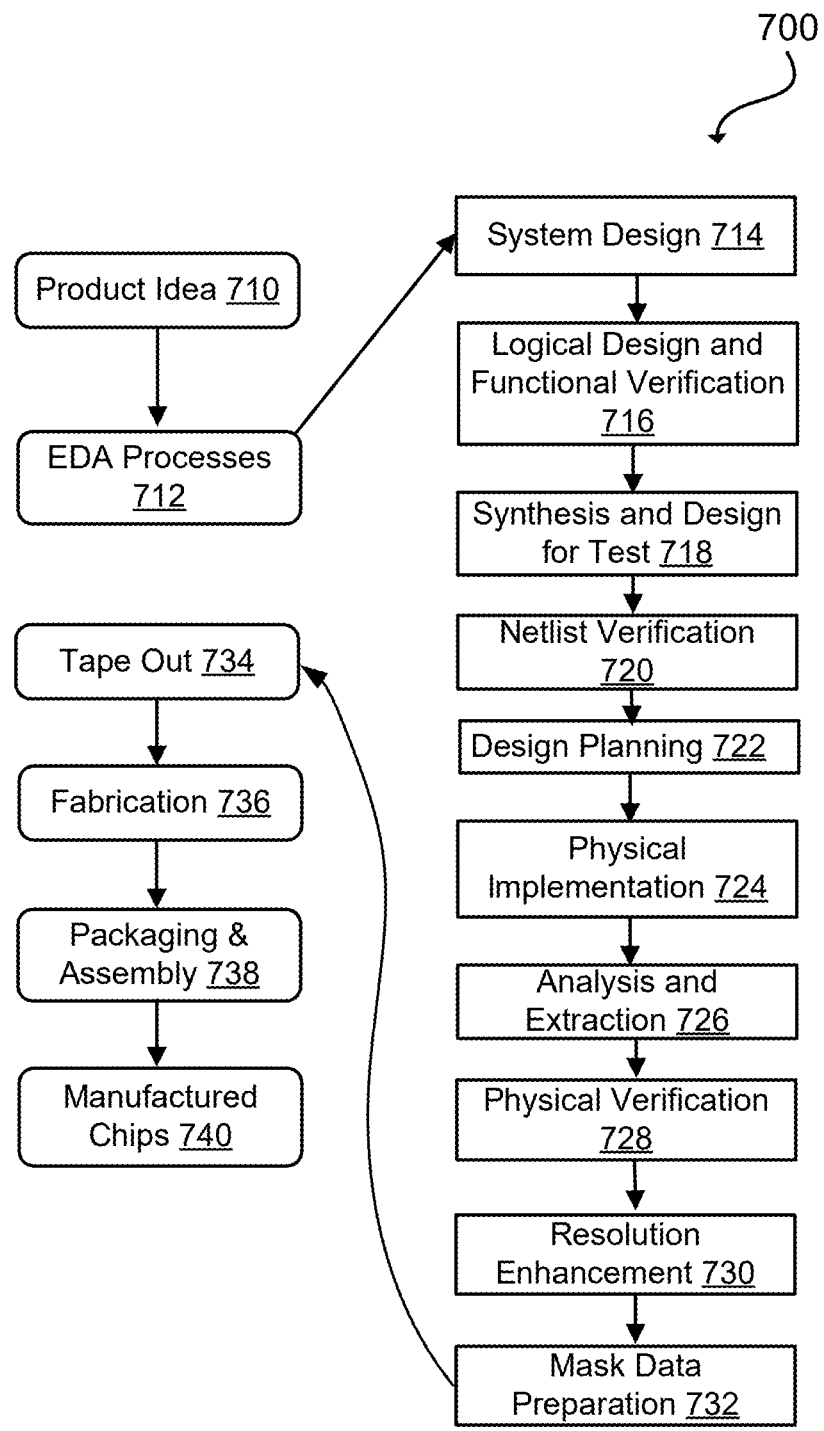
FIG. 7 depicts a flowchart of various processes used during the design and manufacture of an integrated circuit in accordance with some embodiments of the present disclosure.

FIG. 7 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 7. The processes described by be enabled by EDA products (or EDA systems).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 800 of FIG. 8) may be used to store the programs and data structures that are used by some or all of the EDA products described herein, and products used for development of cells for the library and for physical and logical design that use the library.

Figure 8:
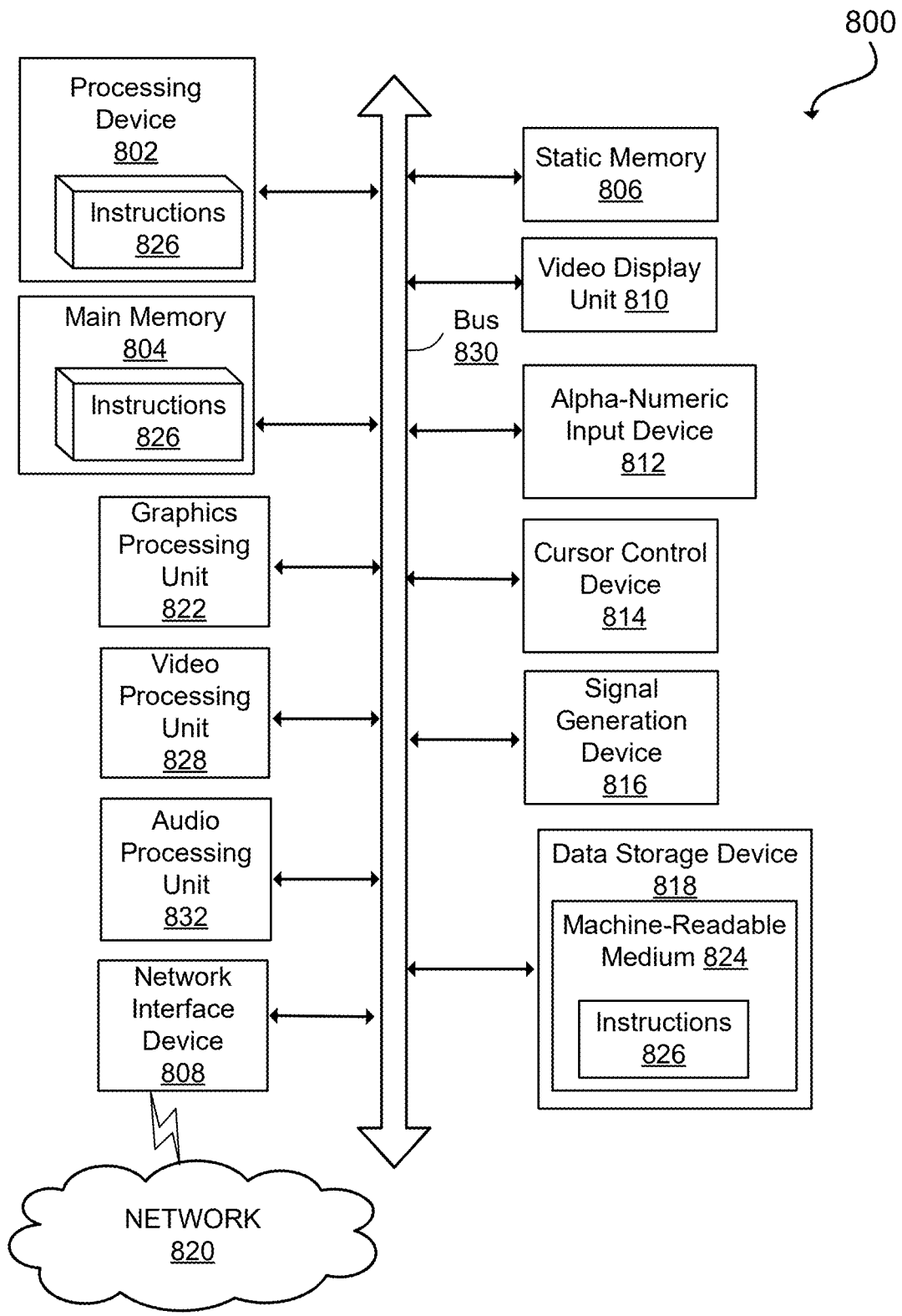
FIG. 8 depicts a diagram of an example computer system in which embodiments of the present disclosure may operate.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   accessing a layout of a lithographic mask used in a mask development process for the lithographic mask, the layout comprising a plurality of disjoint shapes, the lithographic mask used to fabricate a semiconductor integrated circuit;
   determining, by a processor, parametric curve representations of curved borders for at least some of the disjoint shapes in the layout, wherein the parametric curve representations of the curved borders include parameters that are control points not located on the border; and
   using the parametric curve representations of the shapes in the mask development process, comprising:
      estimating a result achieved by the layout of the lithographic mask represented by the parametric curve representations; and
      adjusting the locations of the control points not located on the border, based on a comparison of the estimated result and a desired result.

2. The method of claim 1 wherein the mask development process is a mask synthesis process.

3. The method of claim 2 wherein the mask synthesis process comprises at least one of optical proximity correction, resolution enhancement technology, phase shifting masks, double patterning masks, sub-resolution assist features and inverse lithography.

4. The method of claim 1 wherein the mask development process is a mask verification process.

5. The method of claim 4 wherein the desired result comprises at least one of a desired near field, a desired aerial image and a desired resist contour.

6. The method of claim 4 wherein the mask verification process comprises mask rule checking of the design represented by the parametric curve representations.

7. The method of claim 1 wherein the mask development process is a mask fabrication process for fabricating the lithographic mask from the parametric curve representations.

8. A non-transitory computer readable medium comprising stored instructions, which when executed by a processor, cause the processor to:
   access a layout of a lithographic mask used in a computational lithography process, the layout comprising a plurality of disjoint shapes, the lithographic mask used to fabricate a semiconductor integrated circuit;
   determine parametric curve representations of curved borders for at least some of the disjoint shapes in the layout, wherein the parametric curve representations of the curved borders include parameters that are control points not located on the border; and
   use the parametric curve representations in the computational lithography process, comprising:
      estimating a result achieved by the layout of the lithographic mask represented by the parametric curve representations; and
      adjusting the locations of the control points not located on the border, based on a comparison of the estimated result and a desired result.

9. The non-transitory computer readable medium of claim 8 wherein determining the parametric curve representations for the disjoint shapes comprises:
   initializing the parametric curve representations with initial locations for the control points; and
   migrating the control points from the initial locations to final locations based on the computational lithography process.

10. The non-transitory computer readable medium of claim 9 wherein the disjoint shapes are rectilinear polygons.

11. The non-transitory computer readable medium of claim 8 wherein the parametric curve representations are Bezier curve representations.

12. A system comprising:
   a memory storing instructions; and
   a processor, coupled with the memory and to execute the instructions, the instructions when executed cause the processor to:
      access a layout of a lithographic mask used in a computational lithography process that simulates a lithography system, the layout comprising a plurality of disjoint shapes, the lithographic mask used to fabricate a semiconductor integrated circuit, wherein at least some of the disjoint shapes have curved borders that are represented by parametric curve representations, wherein the parametric curve representations of the curved borders include parameters that are control points not located on the border;
      use the parametric curve representations in the computational lithography process; and
      modify a design of the lithography system based on the computational lithography process, by adjusting the locations of the control points not located on the border.

* * * * *